(12) United States Patent
Lee

(10) Patent No.: US 10,082,233 B2
(45) Date of Patent: Sep. 25, 2018

(54) HOSE QUICK COUPLING

(71) Applicant: Yueh-Lin Lee, Taipei (TW)

(72) Inventor: Yueh-Lin Lee, Taipei (TW)

( * ) Notice: Subject to any disclaimer, the term of this patent is extended or adjusted under 35 U.S.C. 154(b) by 326 days.

(21) Appl. No.: 15/045,249

(22) Filed: Feb. 17, 2016

(65) Prior Publication Data

US 2016/0298799 A1  Oct. 13, 2016

(30) Foreign Application Priority Data

Apr. 8, 2015 (TW) .............................. 104111207 A

(51) Int. Cl.
*F16L 37/18* (2006.01)

(52) U.S. Cl.
CPC .................... *F16L 37/18* (2013.01)

(58) Field of Classification Search
CPC .................. F16L 37/18; F16L 37/20
See application file for complete search history.

(56) References Cited

U.S. PATENT DOCUMENTS

| | | | | |
|---|---|---|---|---|
| 4,295,670 A | * | 10/1981 | Goodall | F16L 37/18 285/312 |
| 5,435,604 A | * | 7/1995 | Chen | F16L 37/18 285/312 |
| 5,722,697 A | * | 3/1998 | Chen | F16L 37/18 285/276 |
| 5,791,694 A | | 8/1998 | Fahl et al. | |
| 5,816,623 A | * | 10/1998 | Chang | F16L 37/18 285/309 |
| 5,911,445 A | | 6/1999 | Lee | |
| 6,053,540 A | * | 4/2000 | Meyer | F16L 37/18 285/312 |
| 6,364,369 B2 | * | 4/2002 | Bailey | F16L 37/18 285/312 |
| 6,543,812 B1 | * | 4/2003 | Chang | F16L 37/18 285/312 |
| 8,083,265 B1 | * | 12/2011 | Chen | F16L 37/18 285/312 |
| 2010/0289260 A1 | * | 11/2010 | Morton | F16L 23/036 285/312 |
| 2012/0043753 A1 | * | 2/2012 | Chen | F16L 37/18 285/88 |

FOREIGN PATENT DOCUMENTS

| | | | | |
|---|---|---|---|---|
| DE | 9303353 U1 | * | 6/1993 | ............. F16L 37/06 |
| DE | 29722309 U1 | * | 4/1998 | |
| EP | 2407699 A2 | * | 1/2012 | ............. F16L 37/18 |
| JP | 3086469 U | * | 12/2001 | ............. F16L 37/18 |

* cited by examiner

*Primary Examiner* — James M Hewitt, II
(74) *Attorney, Agent, or Firm* — Pai Patent & Trademark Law Firm; Chao-Chang David Pai

(57) ABSTRACT

A hose quick coupling used to connect and buckle a nozzle includes a hose coupling main body and at least one buckle device. The buckle device includes a buckle handle pivotally connected to the hose coupling main body, an engaging pin movably disposed in the buckle handle, and a locking piece pivoted to the inner side of the buckle handle. When the engaging pin is biased by an elastic member, the upper end of the engaging pin extends out of the buckle handle and engages with the side wall of the hose coupling main body so that the buckle handle cannot be turned. Conversely, when the engaging pin is pulled to retract into the buckle handle, the engaging pin is disengaged and the buckle handle can be turned so that the nozzle can disengage from the hose coupling main body.

8 Claims, 12 Drawing Sheets

HOSE QUICK COUPLING

BACKGROUND OF THE INVENTION

(a) Field of the Invention

The present invention relates to a hose quick coupling, and more particularly, to a female hose quick coupling which is able to connect with corresponding male hose coupling quickly and has a simple buckle configuration and can be operated easily.

(b) Description of the Prior Art

A female hose coupling is applied to fluid transport equipment for connecting the piping or flexible hose with a corresponding male hose coupling quickly so as to transport fluid, such as oil, water, and the like. As shown in FIG. 1, a female hose coupling comprises a main body 100 and two pairs of pivot seats 200 at two sides of the main body 100. An opening 300 is provided between each pair of pivot seats 200. The opening 300 is in communication with the inside of the main body 100. A buckle handle 400 is pivotally connected to the opening 300. The buckle handle 400 has a protruding portion 401 at a front end thereof. The protruding portion 401 is configured to extend into the main body 100 to buckle a male hose coupling 500 inserted into the main body 100. In order to prevent the buckle handle 400 from unbuckling unexpectedly to cause the male hose coupling 500 to be disengaged from the main body 100, the main body 100 is provided with a safety mechanism. As shown in FIG. 1 and FIG. 2, a buckle plate 600 is provided in the opening 300. The buckle handle 400 comprises a movable shaft 700 and a spring 800 therein. One end 701 of the movable shaft 700 can be buckled to a buckle portion 601 of the buckle plate 600. Another end of the movable shaft 700 is provided with a pull ring 900. When the movable shaft 700 is pushed by the spring 800, the end 701 of the movable shaft 700 is buckled to the buckle plate 600 so that the buckle handle 400 cannot be turned. On the contrary, when the pull ring 900 is pulled rearwards, the end 701 of the movable shaft 700 is disengaged from the buckle plate 600 so that the buckle handle 400 can be turned. However, the aforesaid structure is too complicated. For example, the buckle handle 400 has a twisty shape and the buckle plate 400 must be manufactured separately, which results in a high cost. For an existing hose coupling not having a safety mechanism, it is necessary to provide a buckle handle 400 and a buckle plate 600. The procedure for replacement and assembly is more troublesome.

Some hose couplings are provided with a safety buckle having an anti-disengagement mechanism, as disclosed in U.S. Pat. No. 6,364,369, U.S. Pat. No. 5,791,694, and U.S. Pat. No. 5,911,445. However, the structural feature as shown in U.S. Pat. No. 6,364,369 is that the hose coupling has a concave hole structure corresponding to a steel ball of the buckle handle. As a result, for replacement, the whole hose coupling must be replaced with a new one, not only the buckle handle. The replacement cost is too high. The structure as shown in U.S. Pat. No. 5,791,694 has a locking mechanism to buckle recesses of cam arms. But, it is hard to control the tightness of buckle. If the engagement of the locking mechanism and the recesses of the cam arms is too tight, the user is unable to open the cam arms. On the contrary, if the engagement of the locking mechanism and the recesses of the cam arms is too loose, the safety buckle loses efficacy. In the structure as shown in U.S. Pat. No. 5,911,445, the user cannot pull the pull ring directly to release the buckle state. It is necessary to push the knob and then pull the locking lever. This way is inconvenient for use. Accordingly, the inventor of the present invention has devoted himself based on his many years of practical experiences to solve this problem.

SUMMARY OF THE INVENTION

The primary object of the present invention is to provide a hose quick coupling which is provided with buckle devices pivotally connected to the hose quick coupling. The buckle devices are pivoted to two sides of the hose quick coupling to provide a secure buckling mechanism, without replacing the whole hose quick coupling so as to lower the cost of replacement.

A further object of the present invention is to provide a hose quick coupling which is provided with a buckle handle instead of the conventional buckle plate. The structure of the buckle handle is simple so that the whole structure of the buckle device is simplified to reduce the manufacture cost.

Another object of the present invention is to provide a hose quick coupling which is provided with an engaging pin and a locking piece. The operation of the buckle device is simple and convenient.

DETAILED DESCRIPTION OF THE PREFERRED EMBODIMENTS

Embodiments of the present invention will now be described, by way of example only, with reference to the accompanying drawings.

Figure 1:
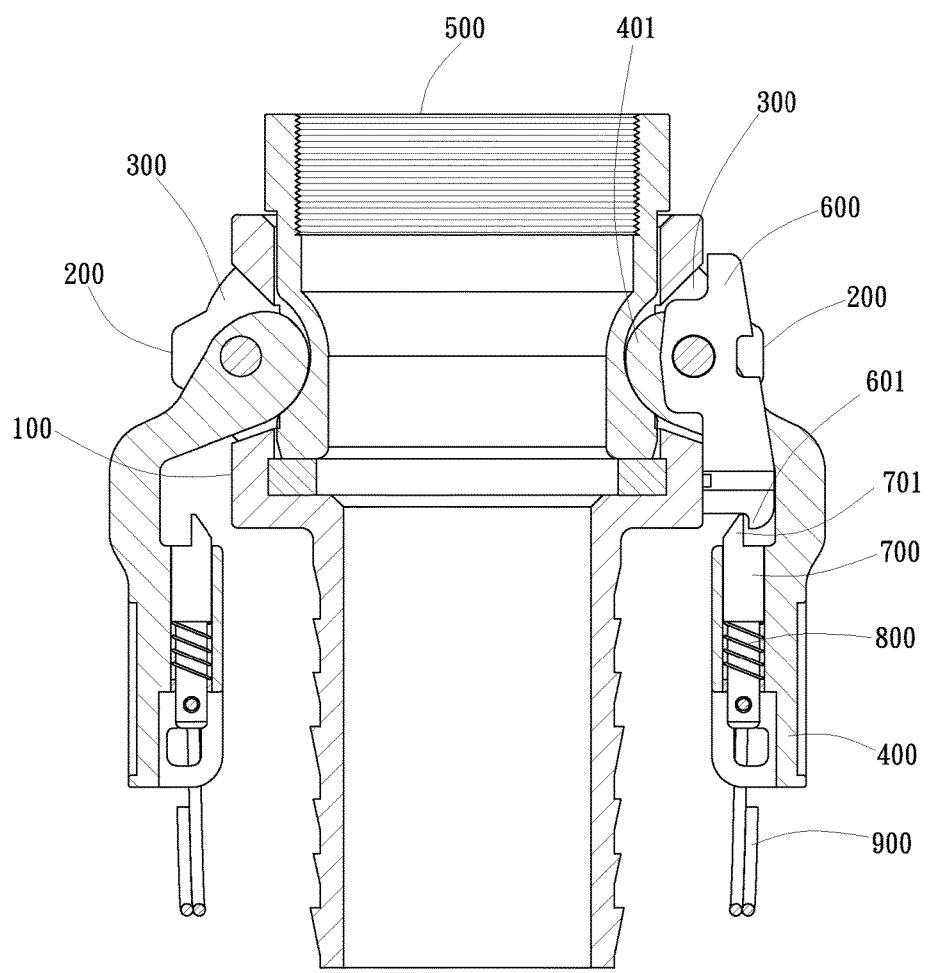
FIG. 1 is a sectional view of a conventional hose coupling.
Figure 2:
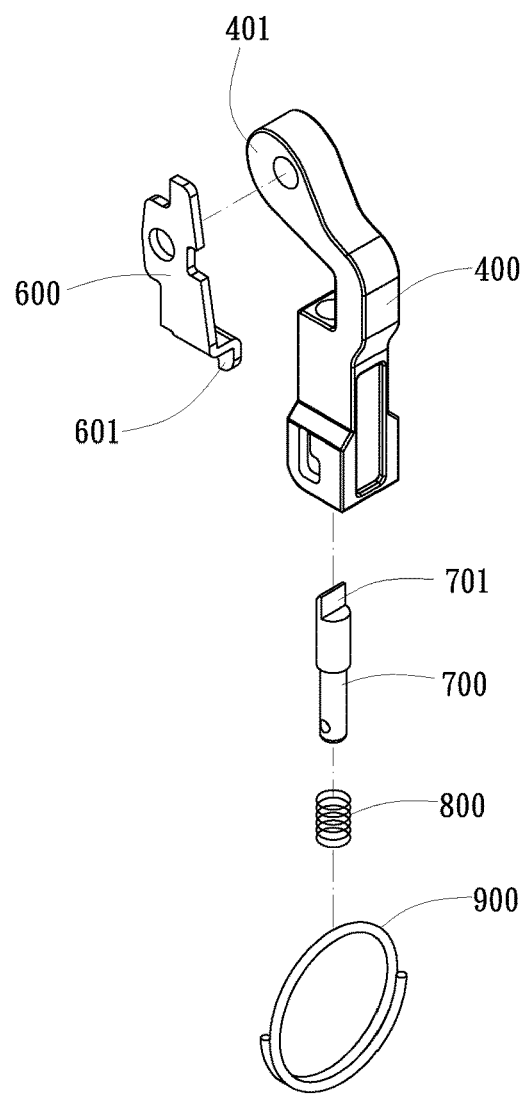
FIG. 2 is an exploded view of a conventional buckle device.
Figure 3:
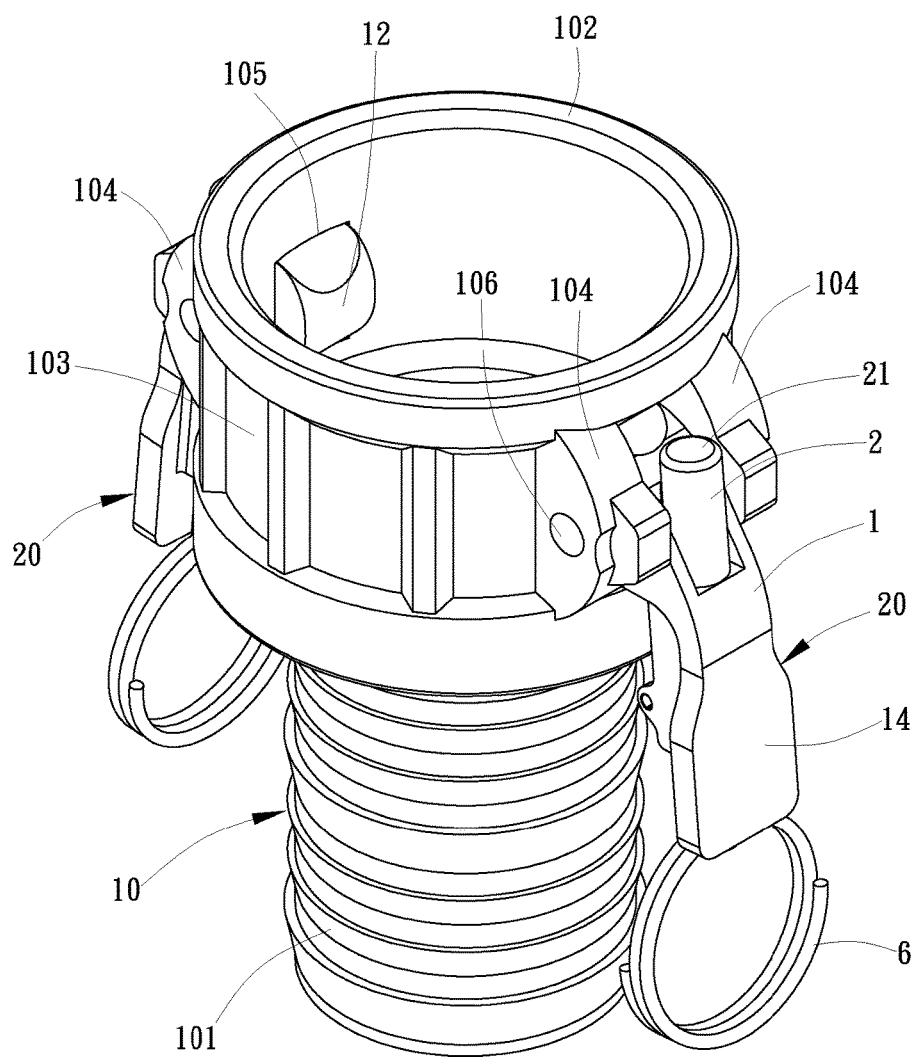
FIG. 3 is a perspective view according to a preferred embodiment of the present invention.
Figure 4:
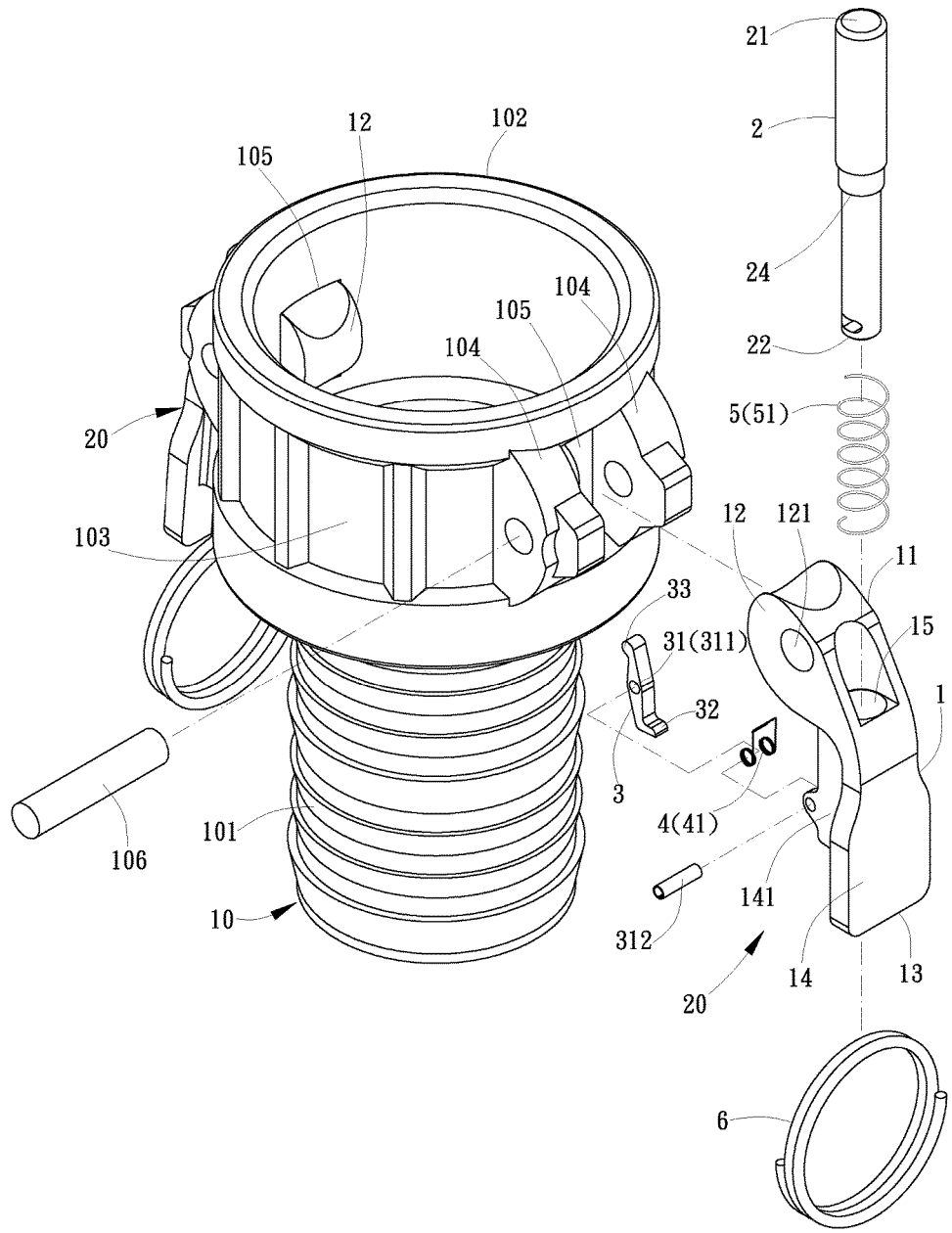
FIG. 4 is an exploded view according to the preferred embodiment of the present invention.

As shown in FIG. 3 and FIG. 4, a hose quick coupling according to a preferred embodiment of the present invention comprises a hose coupling main body 10 and two buckle devices 20.

Figure 8:
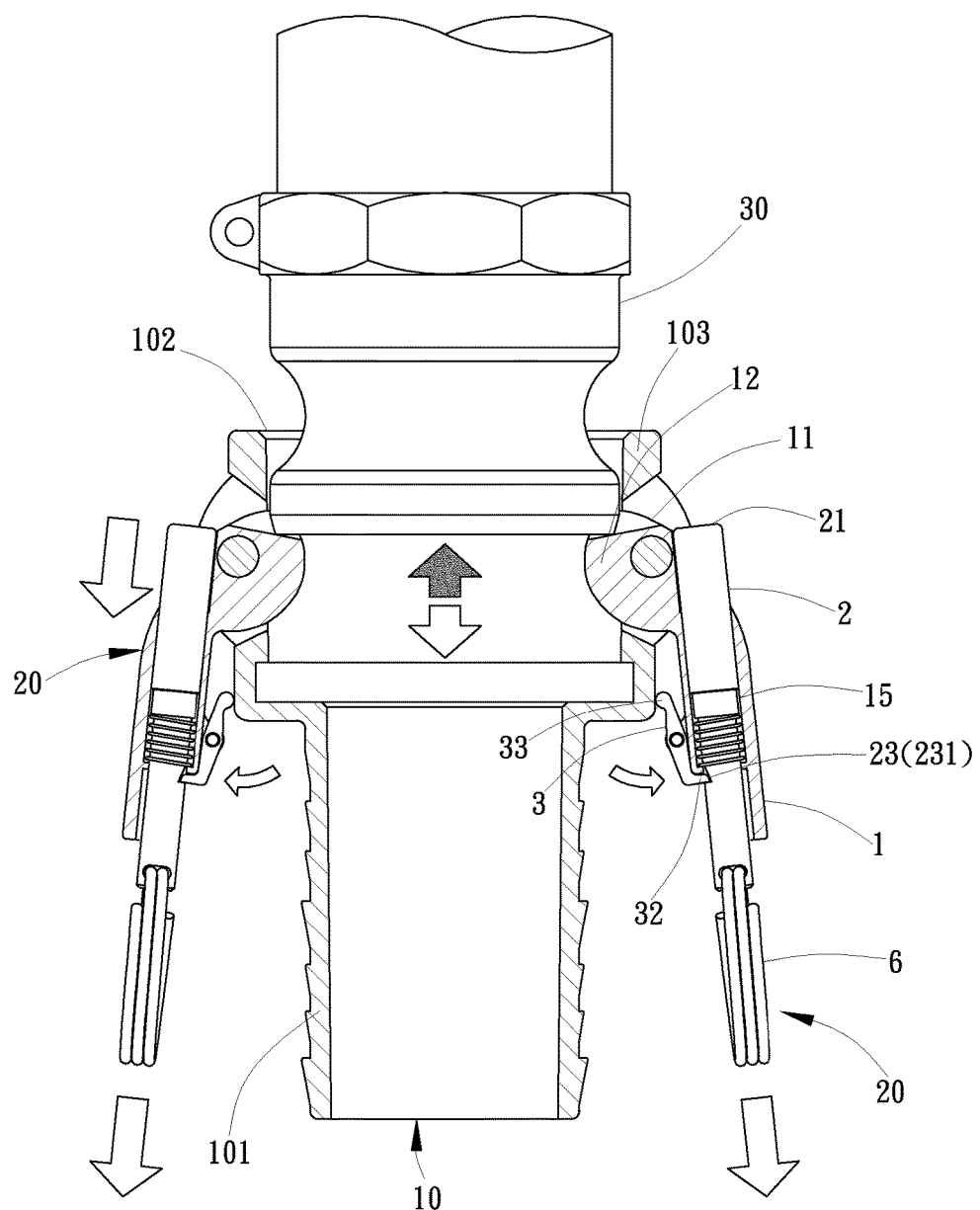
FIG. 8 is a first schematic view of the preferred embodiment of the present invention when in use.

As shown in FIG. 8, the hose coupling main body 10 is used for mounting at the distal end of a piping or flexible hose. The hose coupling main body 10 comprises a pipe body 101 mounted to the piping or flexible hose, a tubular connecting portion 102 connected to one end of the pipe body 101, two pairs of pivot seats 104 located on a side wall 103 of the connecting portion 102, and an opening 105 which is disposed between each pair of the pivot seats 104 and in communication with the inside of the side wall 103 of the connecting portion 102. A pivot shaft 106 is inserted through each pair of pivot seats 104. Through the pivot shaft 106, each buckle device 20 is connected to the hose coupling main body 10. When a nozzle 30 is inserted in the connecting portion 102, the buckle devices 20 are to buckle the nozzle 30, as shown in FIG. 8.

As shown in FIG. 3, FIG. 4, and FIG. 8, each buckle device 20 is movably disposed between each pair of pivot seats 104 of the hose coupling main body 10 and configured to extend inside the connecting portion 102 to buckle the nozzle 30, preventing disengagement of the nozzle 30 from the hose coupling main body 10. The buckle device 20 can be turned to unbuckle the nozzle 30, enabling the nozzle 30 to disengage from the hose coupling main body 10. The buckle device 20 comprises a buckle handle 1 which is movably pivoted between each pair of pivot seats 104, an engaging pin 2 movably disposed in the buckle handle 1, and a locking piece 3 pivoted to one side of the buckle handle 1.

Figure 5:
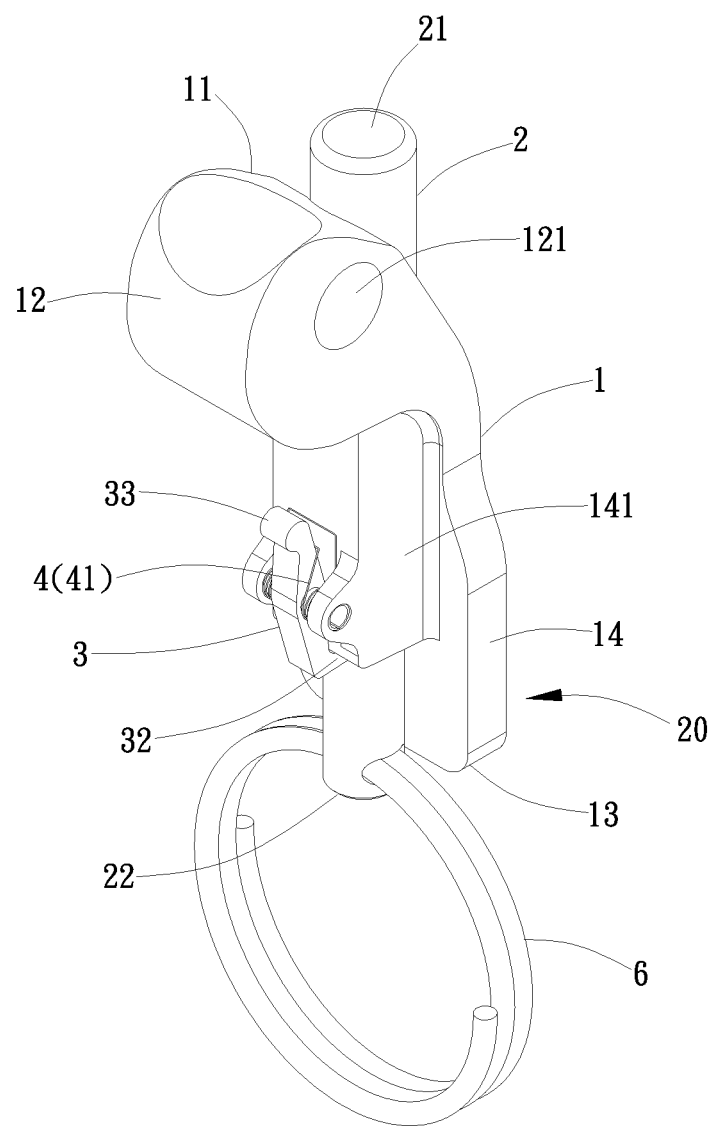
FIG. 5 is a perspective view of the buckle device of the preferred embodiment of the present invention.
Figure 7:
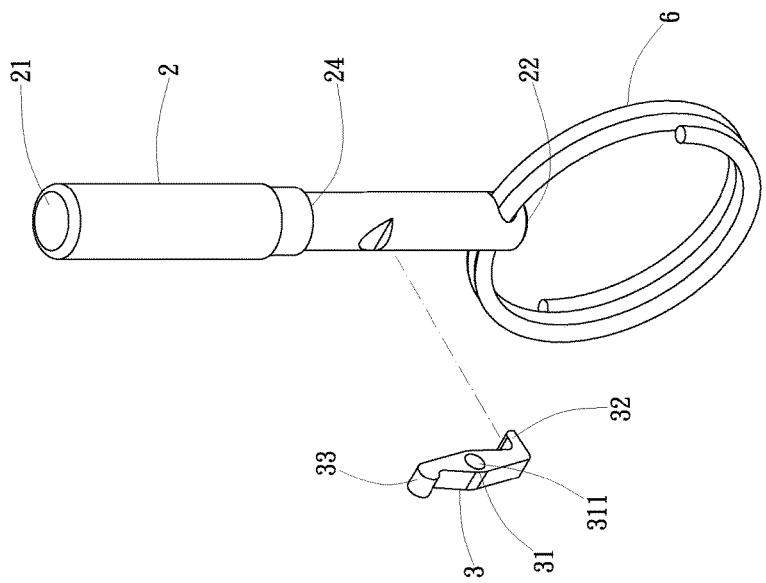
FIG. 7 is an exploded view of the locking piece and the engaging pin of the preferred embodiment of the present invention.
Figure 6:
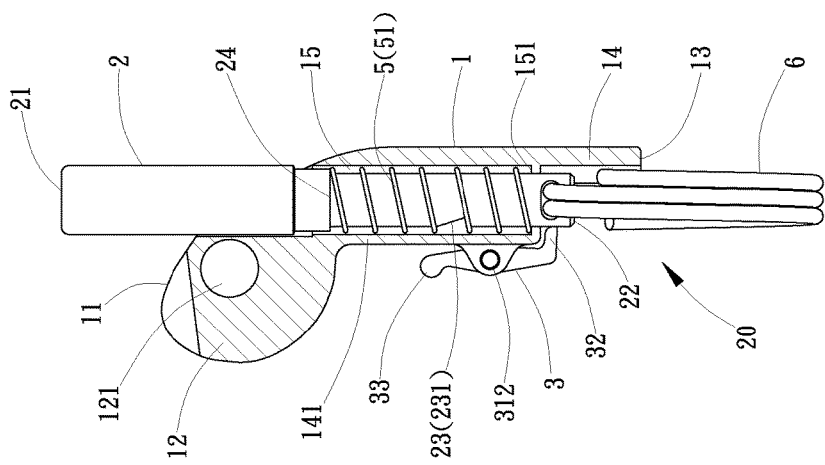
FIG. 6 is a sectional view of the buckle device of the preferred embodiment of the present invention.

As shown in FIG. 4, FIG. 5, and FIG. 6, the buckle handle 1 has a first end 11 and a second end 13. The first end 11 has a buckling protrusion 12. The buckling protrusion 12 extends from the opening 105 of the hose coupling main body 10 to the inside of the side wall 103 of the connecting portion 102. The second end 13 has an operation portion 14. Preferably, the buckling protrusion 12 is an eccentric portion and has a pivot hole 121 at its eccentric portion. The pivot shaft 106 is inserted through the pivot hole 121, such that the buckle handle 1 is pivotally connected between each pair of the pivot seats 104. The buckling protrusion 12 can extend to the inside of the side wall 103 of the connecting portion 102 to buckle the nozzle 30. The operation portion 14 is a plate member or the like, connected to the buckling protrusion 12. The inner side of the operation portion 14 is provided with a block 141. The engaging pin 2 is movably disposed in the block 141.

Figure 9:
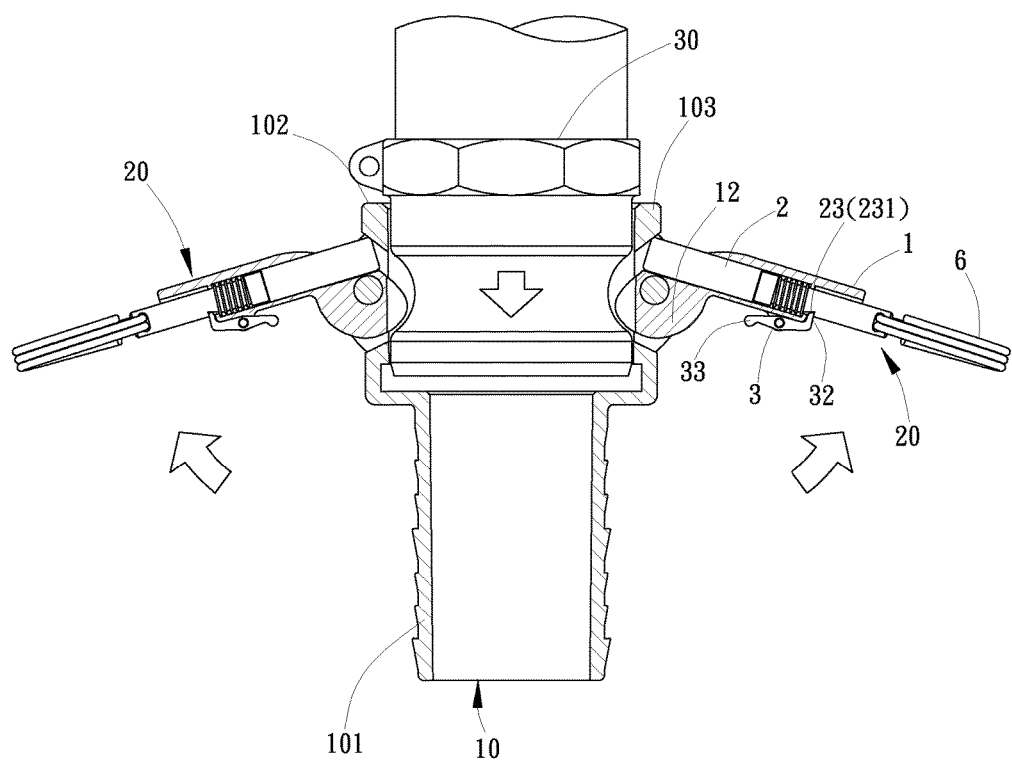
FIG. 9 is a second schematic view of the preferred embodiment of the present invention when in use.
Figure 10:
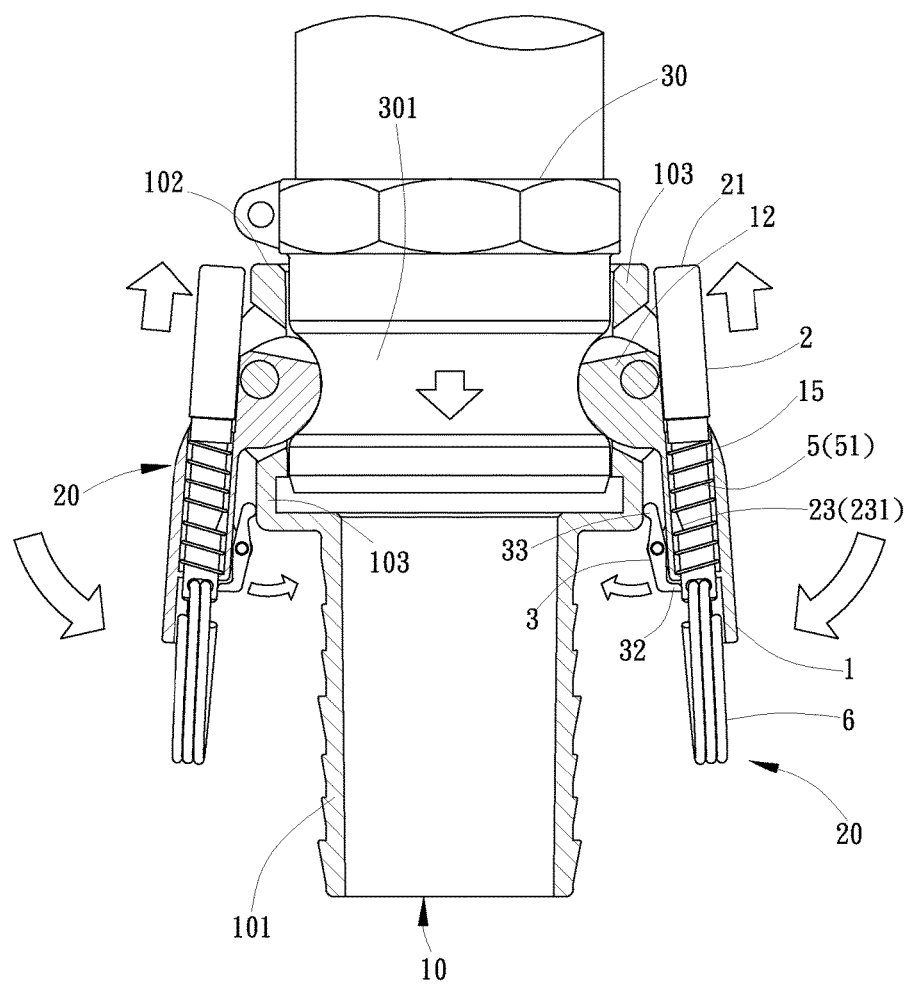
FIG. 10 is a third schematic view of the preferred embodiment of the present invention when in use.

As aforesaid, in the preferred embodiment, the engaging pin 2 is movably disposed in the block 141. One end 21 of the engaging pin 2 extends out of the first end 11 of the buckle handle 1, and another end 22 of the engaging pin 2 extends out of the second end 13 of the buckle handle 1. When the end 21 of the engaging pin 2 extends out of the first end 11, the engaging pin 2 engages with the outside of the side wall 103 of the hose coupling main body 10 so that the buckle handle 1 cannot be turned. As shown in FIG. 10, the nozzle 30 is buckled by the buckling protrusion 12. On the contrary, when the end 21 of the engaging pin 2 is retracted into the buckle handle 1, as shown in FIG. 8, the engaging pin 2 disengages from the outside of the side wall 103 of the hose coupling main body 10 so that the buckle handle 1 can be turned, as shown in FIG. 9. The nozzle 30 is unbuckled from the buckling protrusion 12, enabling the nozzle 30 to disengage from the hose coupling main body 10. One side of the engaging pin 2 is formed with a positioning portion 23. The positioning portion 23 is a recess or other configuration, which can be engaged with the locking piece 3 to limit movement of the engaging pin 2.

The locking piece 3 is pivotally connected to the inner side of the buckle handle 1 to engage with the positioning portion 23 of the engaging pin 2 so as to limit movement of the engaging pin 2. Preferably, the locking piece 3 is a plate or a rod. The locking piece 3 has a pivot portion 31 pivoted to the buckle handle 1. The pivot portion 31 can be a hole 311 or a pin shaft 312. One end of the locking piece 3 is a raised portion 32 to engage with or disengage from the positioning portion 23 (the recess 231), and another end of the locking piece 3 is an action portion 33 to lean against the outside of the side wall 103 of the hose coupling main body 10 for the raised portion 32 to disengage from the positioning portion 23. Furthermore, the present invention further comprises a first elastic member 4 disposed between the locking piece 3 and the buckle handle 1. The first elastic member 4 is a torsion spring 41 or other springs, enabling the first elastic member 4 to hold against the locking piece 3 for the raised portion 32 to engage with the positioning portion 23 (the recess 231).

As shown in FIG. 4 and FIG. 6, the buckle handle 1 has a pin hole 15 penetrating from the first end 11 to the second end 13 and passing through the block 141, such that the engaging pin 2 is movably disposed in the pin hole 15. When the engaging pin 2 is pulled to move towards the second end 13, as shown in FIG. 8, the positioning portion 23 (the recess 231) is exposed out of the pin hole 15 and the raised portion 32 of the locking piece 3 is to engage with the positioning portion 23 (the recess 231). Furthermore, the pin hole 15 is provided with a second elastic member 5, such as a spiral spring 51. The engaging pin 2 is provided with a first axial stop portion 24. The pin hole 15 is provided with a second axial stop portion 151. One end of the second elastic member 5 (the spiral spring 51) leans against the first axial stop portion 24, and another end of the second elastic member 5 (the spiral spring 51) leans against the second axial stop portion 151. The end 21 of the engaging pin 2 is biased by the second elastic member 5 to extend out of the first end 11 of the buckle handle 1 so as to engage with the outside of the side wall 103 of the hose coupling main body 10 to limit turning of the buckle handle 1. In addition, the other end 22 of the engaging pin 2 is coupled with a pull ring 6 or other members for the user to pull. When the pull ring 6 is pulled, the end 21 of the engaging pin 2 is retracted into the pin hole 15 to unbuckle the buckle handle 1.

When the present invention is used, as shown in FIG. 8, the pull ring 6 is pulled rearwards, the end 21 of the engaging pin 2 is retracted into the pin hole 15 from the first end 11 of the buckle handle 1, and the raised portion 32 of the locking piece 3 is to engage with the positioning portion 23 (the recess 231) so that the buckle device 20 is disengaged from the side wall 103 of the hose coupling main body 10. Thus, when the nozzle 30 is inserted in the connecting portion 102 of the hose coupling main body 10, as shown in FIG. 9, the end of the nozzle 30 is to push the buckling portion 12 of the buckle handle 1, enabling the buckle handle 1 to be turned open, such that the nozzle 30 can be inserted to the bottom of the connecting portion 102. Finally, as shown in FIG. 10, the buckle handles 1 of the two buckle devices 20 are pressed to the two sides of the hose coupling main body 10. The action portion 33 of the locking piece 3 leans against the side wall 103 of the hose coupling main body 10, such that the raised portion 32 at the other end disengages from the positioning portion 23. The engaging pin 2 is biased by the second elastic member 5, enabling the end 21 of the engaging pin 2 to extend out of the first end 11 of the buckle handle 1 again to engage with the outside of the side wall 103 of the hose coupling main body 10. The buckling protrusion 12 of the buckle handle 1 is to buckle a neck portion 301 of the nozzle 30, and the buckle handle 1 cannot be turned unexpectedly.

When the user wants to disengage the hose coupling main body 10 from the nozzle 30, as shown in FIG. 8, the pull ring 6 is pulled rearwards. The end 21 of the engaging pin 2 is retracted into the pin hole 15 from the first end 11 of the buckle handle 1, and the raised portion 32 of the locking piece 3 is to engage with the positioning portion 23 (the recess 231) so that the buckle device 20 is disengaged. The nozzle 30 can be disengaged from the hose coupling main body 10 in a reverse direction, referring to FIG. 9.

Figure 11:
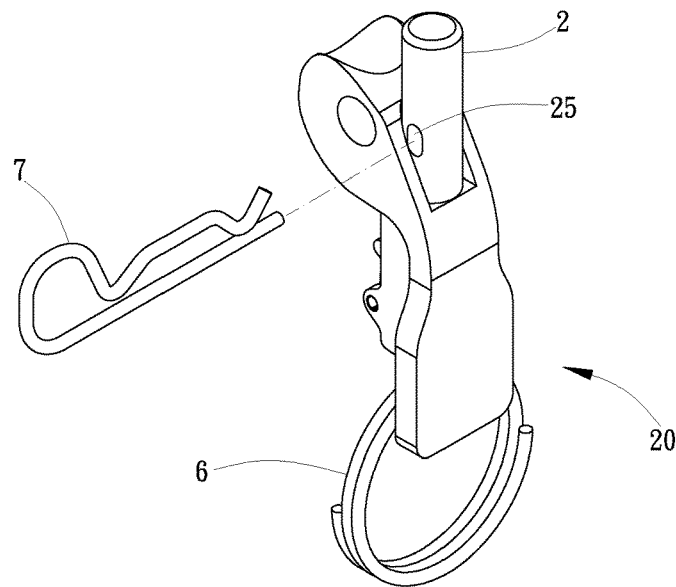
FIG. 11 is an exploded view of the safety clip and the buckle device of the preferred embodiment of the present invention.
Figure 12:
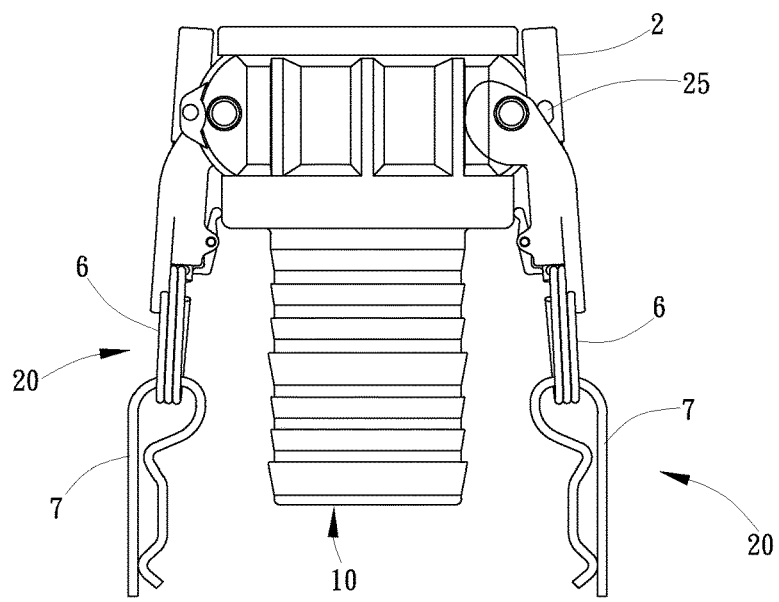
FIG. 12 is a schematic view of the preferred embodiment of the present invention when the safety clip is not used.

Furthermore, as shown in FIG. 11, the engaging pin 2 of the present invention may be provided with a clip hole 25. A safety clip 7 is inserted in the clip hole 25. The safety clip 7 is configured to prevent the engaging pin 2 from moving up and down so as to ensure the engagement. When the safety clip 7 is taken off, as shown in FIG. 12, the safety clip 7 can be hung on the pull ring 6 temporarily, preventing the safety clip 7 from losing. When in use, the safety pin 7 is inserted in the clip hole 25 of the engaging pin 2 again.

Figure 13:
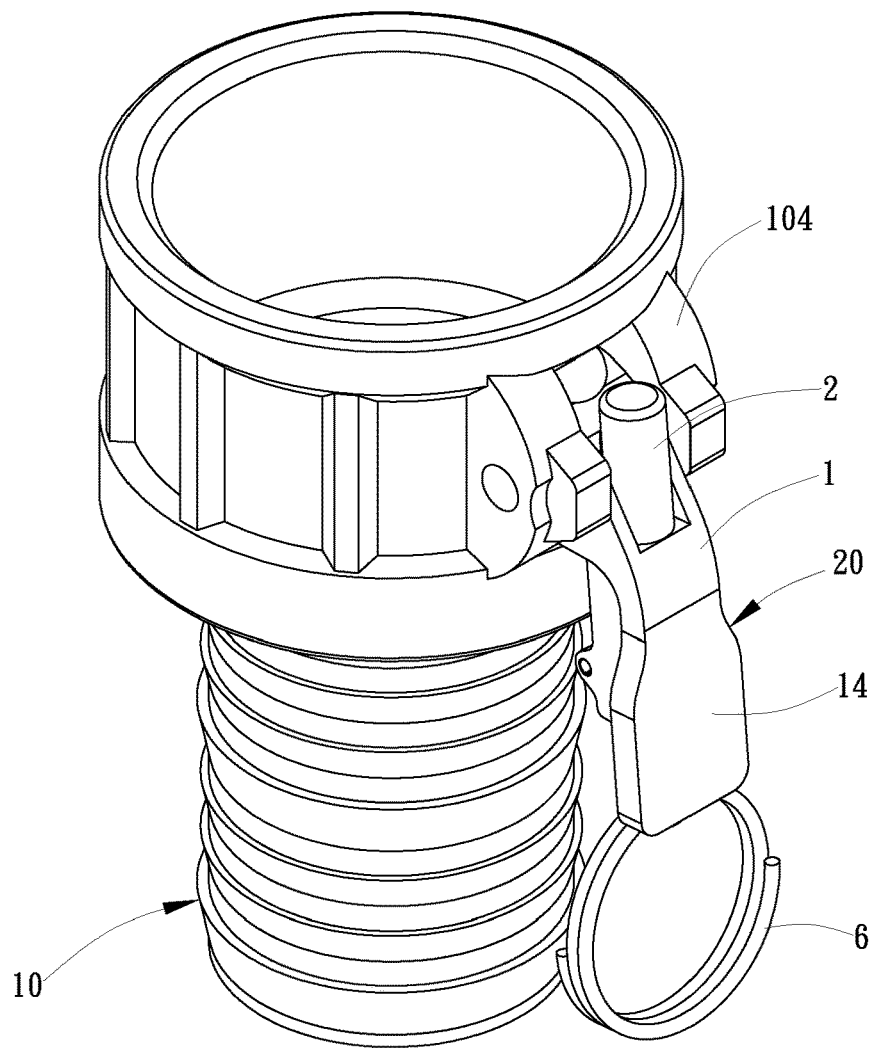
FIG. 13 is a schematic view of the present invention, showing that the hose coupling main body is provided with one buckle device.
Figure 14:
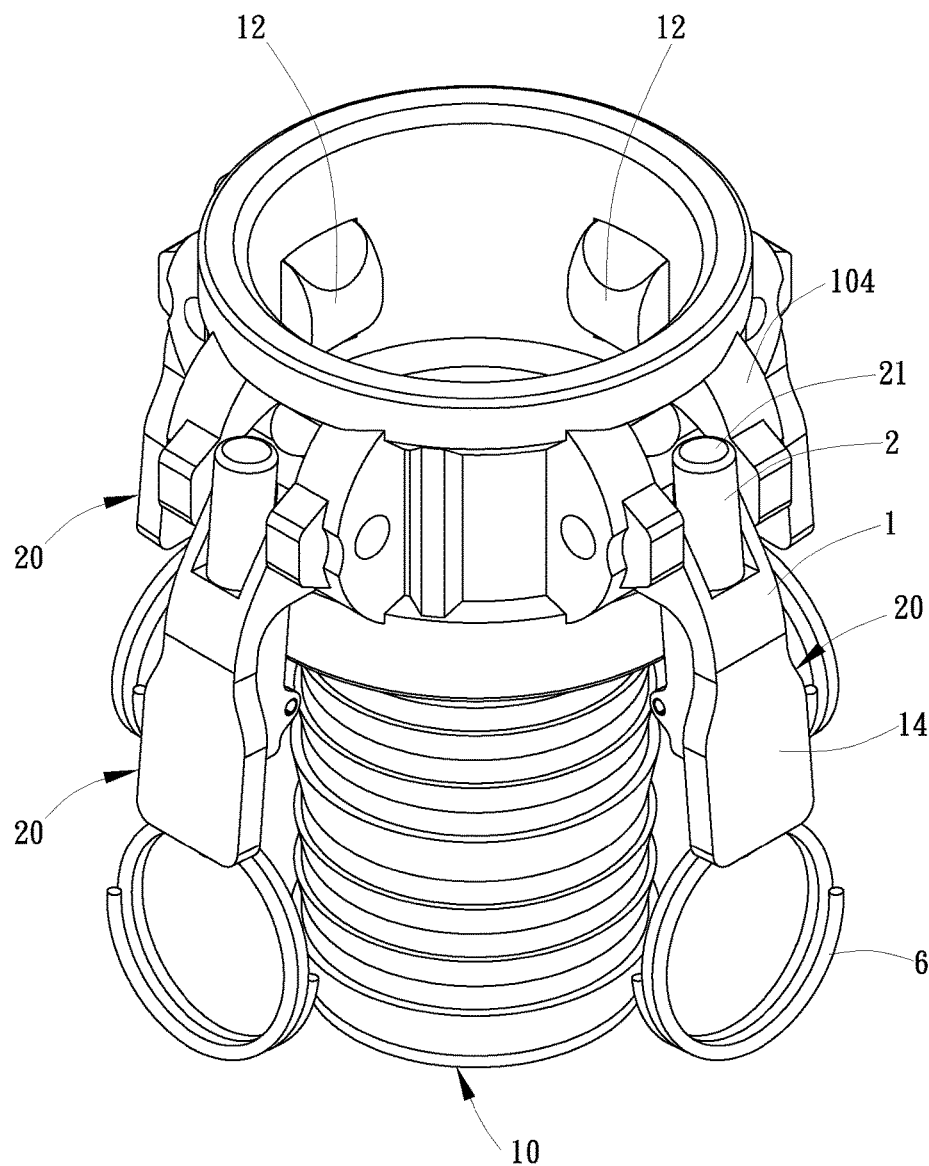
FIG. 14 is a schematic view of the present invention, showing that the hose coupling main body is provided with one buckle device.

The number of the buckle devices 20 of the present invention is not limited to two. As shown in FIG. 13, only one buckle device 20 is provided at one side of the hose coupling main body 10. This structure is applied to the hose coupling main body 10 with a small diameter. As shown in FIG. 14, four buckle devices 20 are provided at four sides of the hose coupling main body 10. This structure is applied to the hose coupling main body 10 with a big diameter. Only the number of the buckle devices 20 is changed. Its structure and assembly and the structure of the hose coupling main body 10 are identical to the aforesaid embodiment.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A hose quick coupling, used to connect with or disconnect from a nozzle, comprising:
   a hose coupling main body, the hose coupling main body having a tubular connecting portion, a pair of pivot seats located on a side wall of the connecting portion, and an opening which is disposed between the two pivot seats and in communication with an inside of the side wall of the connecting portion; and
   a buckle device, the buckle device comprising a buckle handle movably pivoted between the pair of pivot seats, an engaging pin movably disposed in the buckle handle, and a locking piece pivoted to one side of the buckle handle; the buckle handle having a first end and a second end, the first end having a buckling protrusion, the buckling protrusion extending from the opening of the hose coupling main body to the inside of the side wall of the connecting portion, the second end having an operation portion; one end of the engaging pin adapted for extending out of the first end of the buckle handle to engage with an outside of the side wall of the hose coupling main body or retreating toward the second end of the buckle handle to disengage from the side wall of the hose coupling main body, another end of the engaging pin extending out of the second end of the buckle handle, one side of the engaging pin being formed with a positioning portion; the locking piece being rotatable to engage with the positioning portion of the engaging pin so as to limit movement of the engaging pin,
   wherein the locking piece has a pivot portion pivoted to the buckle handle, one end of the locking piece is a raised portion to engage with the positioning portion, and another end of the locking piece is an action portion to lean against the outside of the side wall of the hose coupling main body for the raised portion to disengage from the positioning portion,
   wherein the positioning portion is a recess, the raised portion is configured to correspond to the recess, and a first elastic member is disposed between the locking piece and the buckle handle, the first elastic member being a torsion spring configured to push the locking piece for the raised portion to engage with the positioning portion.

2. The hose quick coupling as claimed in claim 1, wherein the buckle handle has a pin hole penetrating from the first end to the second end, the engaging pin is movably disposed in the pin hole, and when the engaging pin is moved towards the second end, the positioning portion is exposed out of the pin hole for the raised portion of the locking piece to engage with the positioning portion.

3. The hose quick coupling as claimed in claim 1, further comprising a pull ring, the pull ring being coupled to the end of the engaging pin at the second end of the buckle handle.

4. The hose quick coupling as claimed in claim 1, wherein the engaging pin is provided with a clip hole, and a safety clip is inserted in the clip hole.

5. The hose quick coupling as claimed in claim 1, wherein the hose coupling main body has two pairs of pivot seats located on two sides of the side wall of the connecting portion, the opening is disposed between each pair of pivot seats and in communication with the inside of the side wall of the connecting portion, and two buckle devices are pivotally connected to the two pairs of pivot seats, respectively.

6. The hose quick coupling as claimed in claim 1, wherein the hose coupling main body has four pairs of pivot seats located on four sides of the side wall of the connecting portion, the opening is disposed between each pair of pivot seats and in communication with the inside of the side wall of the connecting portion, and four buckle devices are pivotally connected to the four pairs of pivot seats, respectively.

7. A hose quick coupling, used to connect with or disconnect from a nozzle, comprising:
   a hose coupling main body, the hose coupling main body having a tubular connecting portion, a pair of pivot seats located on a side wall of the connecting portion, and an opening which is disposed between the two pivot seats and in communication with an inside of the side wall of the connecting portion; and
   a buckle device, the buckle device comprising a buckle handle movably pivoted between the pair of pivot seats, an engaging pin movably disposed in the buckle handle, and a locking piece pivoted to one side of the buckle handle; the buckle handle having a first end and a second end, the first end having a buckling protrusion, the buckling protrusion extending from the opening of the hose coupling main body to the inside of the side wall of the connecting portion, the second end having an operation portion;
   one end of the engaging pin adapted for extending out of the first end of the buckle handle to engage with an outside of the side wall of the hose coupling main body or retreating toward the second end of the buckle handle to disengage from the side wall of the hose coupling main body, another end of the engaging pin extending out of the second end of the buckle handle, one side of the engaging pin being formed with a positioning portion; the locking piece being rotatable to engage with the positioning portion of the engaging pin so as to limit movement of the engaging pin, wherein the locking piece has a pivot portion pivoted to the buckle handle, one end of the locking piece is a raised portion to engage with the positioning portion, and another end of the locking piece is an action portion to lean against the outside of the side wall of the hose coupling main body for the raised portion to disengage from the positioning portion, wherein the positioning portion is a recess, the raised portion is configured to correspond to the recess, and a first elastic member is disposed between the locking piece and the buckle handle, the first elastic member being configured to push the locking piece for the raised portion to engage with the positioning portion, wherein the buckle handle has a pin hole penetrating from the first end to the second end, the engaging pin is movably disposed in the pin hole, and when the engaging pin is moved towards the second end, the positioning portion is exposed out of the pin hole for the raised portion of the locking piece to engage with the positioning portion, and wherein a second elastic member is disposed in the pin hole, the second elastic member being configured to push the engaging pin to extend out of the first end of the buckle handle.

8. The hose quick coupling as claimed in claim 7, wherein the engaging pin is provided with a first axial stop portion, the pin hole is provided with a second axial stop portion, the second elastic member is a spiral spring, one end of the spiral spring leans against the first axial stop portion, and another end of the spiral spring leans against the second axial stop portion.

* * * * *